May 26, 1959  I. KRAMER ET AL  2,887,948
TEA BAG SQUEEZER AND SPOON
Filed Sept. 30, 1957

INVENTOR.
IRVING KRAMER.
VINCENT L. DION.
BY
Louis V. Lucia
ATTORNEY.

United States Patent Office 2,887,948
Patented May 26, 1959

2,887,948
TEA BAG SQUEEZER AND SPOON

Irving Kramer and Vincent L. Dion, Hartford, Conn., assignors to Kradion Corporation, Hartford, Conn., a corporation of Connecticut Application September 30, 1957, Serial No. 686,995

3 Claims. (Cl. 100—213)

This invention relates to a tea bag squeezer and spoon and an object of the invention is to provide a device which is particularly adapted for squeezing tea bags but which can also be used as a spoon for stirring and the like.

Further objects and advantages of this invention will be more clearly understood from the following description and the accompanying drawings in which.

Figure 1:
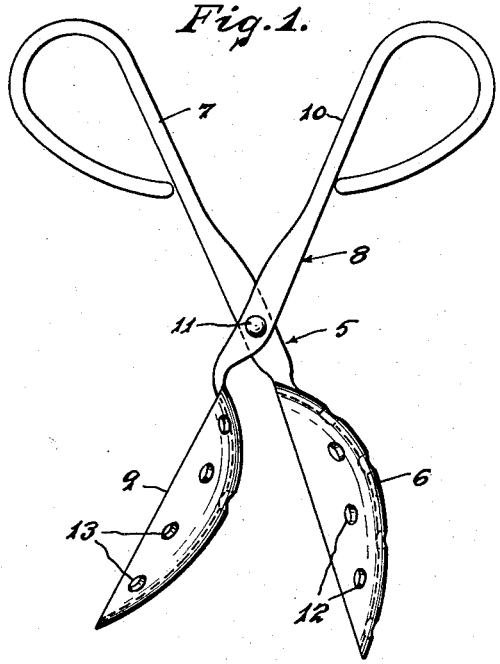
Fig. 1 is a side view of my improved tea bag squeezer and spoon in open position.
Figure 2:
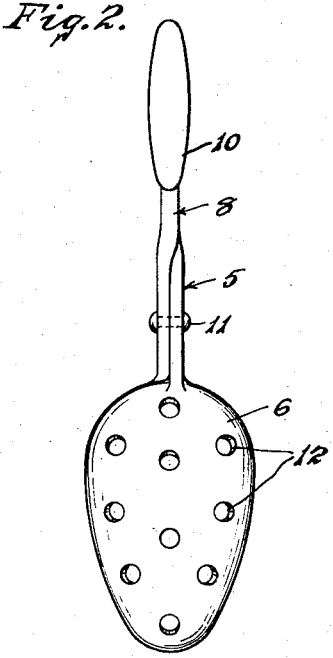
Fig. 2 is a bottom view thereof.
Figure 3:
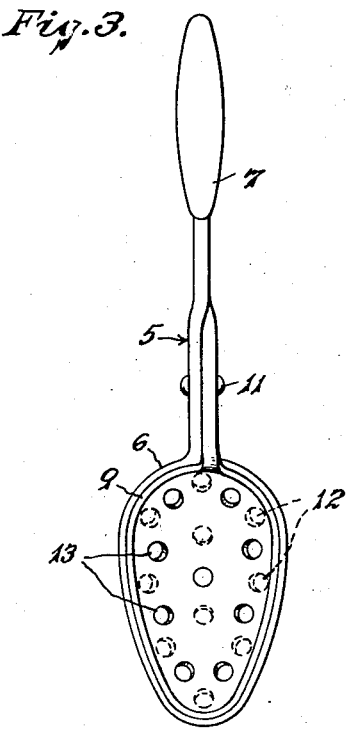
Fig. 3 is a top view.

In the embodiment of the invention illustrated in the drawings, the numeral 5 denotes an outer member including a spoon-shaped portion 6 and a handle 7 and the numeral 8 denotes an inner member having the spoon-shaped portion 9 and a handle 10.

The said members are pivoted together at 11 and the portion 9 of the inner member is adapted to nest closely within the portion 6 of the outer member when the device is in closed position. Each of the said spoon portions of the outer and inner members are perforated with a series of holes 12 and 13, respectively, and the holes 13 are out of alignment with respect to the holes 12 so that, when the said device is in closed position, the holes will be closed and it can be used for such as spooning sugar or the like.

In the use of the device for squeezing a tea bag, it is first opened and the bag is placed between the spoon-shaped portions and then squeezed by closing the device. This will cause the liquid within the tea bag to be squeezed out between the spoon portions 6 and 9 and through the holes 12 and 13 thereof. The bag is then discarded and the device may be closed and used as a spoon.

I claim:

1. A device for squeezing tea bags and the like comprising a pair of members each having a handle provided with a grip portion at one end and a spoon-shaped portion at the other end, means pivotally connecting said handles intermediate their ends whereby said members may be moved to open and closed positions, said spoon-shaped portions being adapted to nest one within the other to thereby form a single spoon when the device is closed and each having a plurality of perforations therethrough which are out of alignment with the perforations in the other of said spoon-shaped portions whereby said perforations are closed when the spoon-shaped portions are in nested position.

2. A device for squeezing tea bags and the like comprising a pair of members having handles which are pivotally connected and concavo-convex spoon-shaped portions at the ends of said handles adapted to nest one within the other to form a single spoon, said spoon-shaped portions each having a plurality of perforations therethrough which are out of alignment with the perforations in the other spoon-shaped portion whereby, when said portions are in nested position, said perforations are closed and passage of solids therethrough is prevented.

3. A device for squeezing tea bags and the like comprising a pair of members having handles which are pivotally connected and concavo-convex spoon-shaped bowl portions on the ends of said handles adapted to nest one within the other to form a spoon, each of said bowl portions having perforations therethrough which are out of alignment with the perforations in the other bowl portion when said portions are in nested relation, one of the perforations in the outer bowl portion being located at the deepest part thereof.

References Cited in the file of this patent
UNITED STATES PATENTS

| 19,419 | Haines | Feb. 23, 1858 |
| 232,029 | Haile | Sept. 7, 1880 |
| 1,334,169 | Royer | Mar. 16, 1920 |
| 2,484,461 | Perry | Oct. 11, 1949 |
| 2,522,343 | Canfield | Sept. 12, 1950 |